Sept. 26, 1933.   E. A. TAYLOR   1,927,963
CATALYST FOR AMMONIA OXIDATION
Filed Aug. 18, 1932
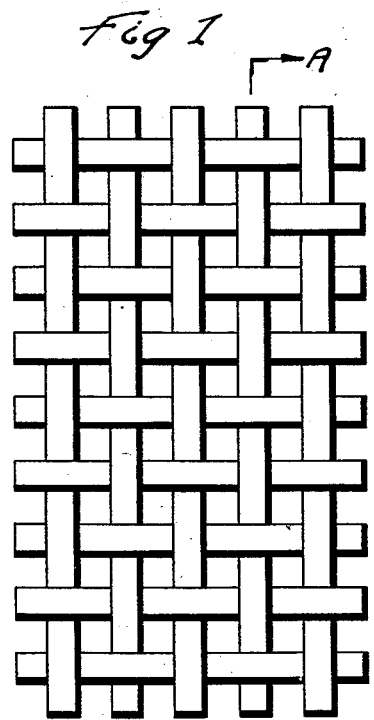
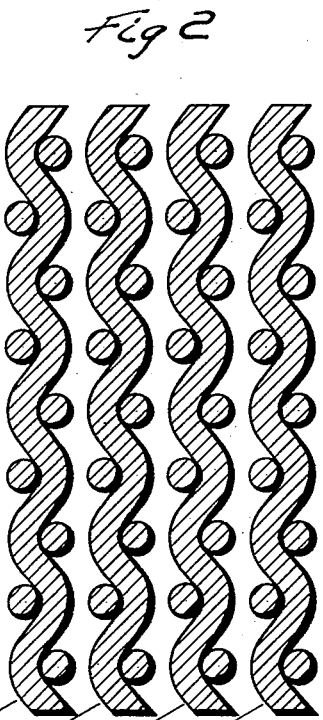
INVENTOR.
BY Edward A. Taylor
ATTORNEY.

Patented Sept. 26, 1933

1,927,963

UNITED STATES PATENT OFFICE 1,927,963

CATALYST FOR AMMONIA OXIDATION

Edward A. Taylor, Cleveland, Ohio, assignor to The Grasselli Chemical Company, Cleveland, Ohio, a corporation of Delaware Application August 18, 1932. Serial No. 629,395

10 Claims. (Cl. 23—234)

The present invention relates to ammonia oxidation and comprises catalyst units composed of elements of a platinum alloy composition of high efficiency and relatively low mechanical strength, such as a platinum-rhodium alloy containing, for instance, about 10 and more per cent rhodium, and a platinum composition of relatively lower efficiency but high mechanical strength, such as essentially pure platinum or a platinum-rhodium alloy of low rhodium content.

Up to recently essentially pure platinum has been used as the catalyst for ammonia oxidation. C. W. Davis has shown in his U. S. Patents 1,706,055 and 1,850,316 that with catalysts composed of alloys of platinum, particularly those with rhodium, the oxidation of the ammonia can be run at higher catalyst temperatures and that higher conversions are obtained.

As stated in the above patents, the platinum alloys, particularly those which contain a high percentage of rhodium, are rather brittle and the wire gauzes made therefrom, when not handled carefully, are liable to early deterioration.

I have found that the conversion efficiency of the catalyst units made of multiple platinum-rhodium alloy elements, as disclosed in said Davis patents, is substantially maintained when part of the platinum-rhodium alloy elements in such units is replaced, preferably in an alternating fashion, by elements of essentially pure platinum or alloy of lower rhodium content.

The platinum elements introduced or intercalated with platinum rhodium elements to form complete units, do not become brittle and do not deteriorate at the reaction temperatures used.

Ammonia oxidation catalysts consist ordinarily of an assembly of elements constituted by wire gauzes, closely following each other.

According to my invention, I assemble wire gauzes of different composition, efficiency and different mechanical strength.

The appended drawing shows catalyst units constructed according to my invention.

Fig. 1 is an enlarged plan view of a section of such a unit comprising a set of several wire gauzes. As the openings of the gauzes are in strict alignment only the upper gauze can be represented in this figure; it may be of pure platinum or a platinum-rhodium alloy.

Fig. 2 is a cut on lines A—B of Fig. 1. It shows 4 gauzes closely assembled. The first gauze to the left is composed of a platinum-rhodium alloy; the next gauze is made of pure platinum, or a platinum-rhodium alloy of a lesser rhodium content than the first gauze; the third gauze is of the same compositions as the first gauze; and the fourth gauze is of the same composition as the second gauze.

I use for instance first a gauze of high efficiency composed of wires of rhodium or a platinum-rhodium alloy, following this I affix a gauze of lower efficiency but higher mechanical strength which is composed of wires of a platinum-rhodium alloy of a lesser rhodium content or of essentially pure platinum. If more than two wire gauzes are desired for making up the catalyst, I affix after the two first gauzes other gauzes of platinum or platinum rhodium alloys in any convenient fashion.

The most convenient form of catalyst assembly according to my invention consists of a platinum alloy gauze and an essentially pure platinum gauze assembled together to form a catalyst.

To such a two layer element catalyst I can affix additional gauzes of pure platinum alone, or of a platinum alloy, etc.

A widely used catalyst for ammonia oxidation consists of four gauze elements as closely assembled as possible to form a catalyst. In such an assembly I use a first gauze of the alloy, 90% platinum with 10% rhodium. This is followed by a platinum gauze. The third layer is again made of the alloy and the fourth layer is platinum.

The openings of the four gauzes are preferably kept in very strict alignment and the four gauzes are spot welded on one inch centers.

A catalyst of this type gave, after a few days working in period an efficiency of 97–98% and after a few months use it still showed an efficiency of 95–96%, whereas a pure platinum catalyst of the same construction gave an efficiency of 95% at the start, which decreased after several months operation to 93%.

In using such catalyst units composed of alternating elements of platinum and platinum alloy, I prefer in general to make the assembly in such a fashion that the alloy gauze is in front, that is to say, that the ammonia air mixture hits the alloy gauze first.

In another very successful assembly I have used a platinum-rhodium alloy gauze first, followed by three platinum gauzes. This unit was worked in for a few days with the alloy gauze in the back, whereby the pure platinum gauze was activated by the gas stream hitting it first. The catalyst unit was then reversed so that the alloy gauze was in front and became activated. When worked in this manner the catalyst gave an efficiency of 98–99% at first and the efficiency remained at 98% or above after three months use.

Other combinations of platinum and alloy gauzes have been used according to this invention and similar results obtained. It was in each instance found that the combination catalysts had a greater life and are less liable to deteriorate than straight platinum-rhodium alloy catalyst of the same efficiency.

The increase in efficiency and decrease of mechanical strength runs in general parallel to the increase of rhodium in the platinum alloy compositions. It is therefore not necessary to use pure platinum as the carrier or supporting element for the highly efficient platinum-rhodium elements in the catalyst of my invention. I can also use in the above described units instead of pure platinum, a platinum alloy of lower rhodium content but greater mechanical strength than the efficient alloy of relatively high rhodium content and low mechanical strength.

I claim:

1. A catalyst for ammonia oxidation composed essentially of platinum and rhodium and consisting of elements of a different chemical composition and different efficiency and mechanical strength, the elements of high efficiency being of low mechanical strength and the elements of high mechanical strength being of lower efficiency.

2. A catalyst for ammonia oxidation composed essentially of platinum and rhodium and consisting of elements of a different chemical composition and different efficiency and mechanical strength, platinum being present in each element, the elements of high efficiency being of low mechanical strength and the elements of high mechanical strength being of lower efficiency.

3. A catalyst for ammonia oxidation consisting of elements of different platinum and rhodium content and of different efficiency and mechanical strength, the elements of high efficiency being of low mechanical strength and the elements of high mechanical strength being of lower efficiency.

4. A catalyst for ammonia oxidation consisting of elements of different platinum and rhodium content and of different efficiency and mechanical strength, platinum being present in each element, the elements of high efficiency being of low mechanical strength and the elements of high mechanical strength being of lower efficiency.

5. A catalyst for ammonia oxidation consisting of at least one element of essentially pure platinum and of at least one element of a platinum and rhodium alloy.

6. A catalyst for ammonia oxidation composed essentially of platinum and rhodium, consisting of a plurality of wire gauzes in which the gauzes have different chemical composition and different efficiency and mechanical strength, the gauzes of high efficiency being of low mechanical strength and the gauzes of high mechanical strength being of lower efficiency.

7. A catalyst for ammonia oxidation composed essentially of platinum and rhodium, consisting of a plurality of wire gauzes in which the gauzes have different chemical composition and different efficiency and mechanical strength, platinum being present in each gauze, the gauzes of high efficiency being of low mechanical strength and the gauzes of high mechanical strength being of lower efficiency.

8. A catalyst for ammonia oxidation consisting of at least one wire gauze of essentially pure platinum and of at least one wire gauze of a platinum rhodium alloy.

9. A catalyst unit for ammonia oxidation consisting of alternating wire gauzes of essentially pure platinum and a platinum alloy.

10. A catalyst unit for ammonia oxidation consisting of a wire gauze of a platinum rhodium alloy, followed by three wire gauzes of platinum.

EDWARD A. TAYLOR.